Sept. 8, 1931. J. JONAS 1,822,701
LOCATING EARTH FAULTS IN ELECTRICAL SYSTEMS
Filed Sept. 11, 1926
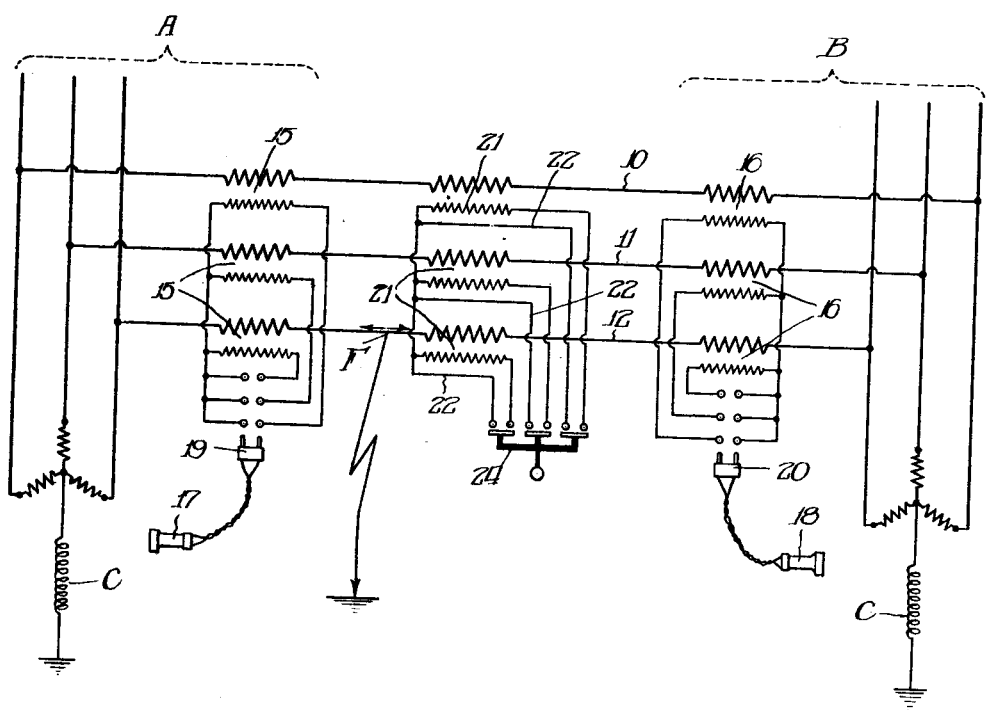
Inventor:
Julius Jonas,
By Cromwell, [illegible]
attys.

Patented Sept. 8, 1931

1,822,701

UNITED STATES PATENT OFFICE

JULIUS JONAS, OF BADEN, SWITZERLAND, ASSIGNOR TO AKTIENGESELLSCHAFT BROWN BOVERI & CIE., OF BADEN, SWITZERLAND, A JOINT-STOCK COMPANY OF SWITZERLAND

LOCATING EARTH FAULTS IN ELECTRICAL SYSTEMS

Application filed September 11, 1926, Serial No. 134,847, and in Germany October 14, 1925.

This invention pertains to method and apparatus for the locating of earth faults in electrical systems, particularly the selective location of faults as between different portions of a line.

A general object of the invention is the provision of method and means whereby the relative location of an earth fault in a high tension electrical system or network may be determined, as between different portions of the faulty line, in a simple and reliable manner.

Another object is the provision of a method and means whereby the location of a fault as between different portions of the faulty line may be determined from the harmonic currents occuring as a result of the fault.

Other and further objects of the invention will be pointed out or indicated hereinafter or will appear to one skilled in the art upon an understanding of the invention or its employment in practice.

In the drawing forming a part of this specification I illustrate in diagrammatic fashion one arrangement of apparatus whereby the invention may be practiced, but this is presented for purpose of illustration only and the invention as claimed is not to be construed as limited to employment of the specific apparatus shown.

In the drawing the figure is a diagram representing a line fed from two sources of electrical energy and equipped with means for determining the location of a fault in the line as between different sections thereof.

When an earth fault occurs in a high tension line, the current flowing to earth through the fault is largely capacitative and is known as the fault current, or if the system is provided with inductive protective devices such as blow out choking coils, it may be termed the residual fault current. If the earthing reactance is tuned to resonance with the system, then this current contains the watt and harmonic components of the earth fault current. The harmonic component may be utilized for the detection of the faulty line by use of suitable instruments, such as a telephone receiver responsive to said component, which will indicate the faulty line by the loudness of tone resulting from the fact that such line carries the sum of all of the harmonics of the system, as pointed out in my co-pending application Serial No. 80,082. The present invention has to do with the location of the fault as between different sections of the line in which the fault exists, which sections are in series and may be receiving power from both ends. This is accomplished by the selective variation of impedance conditions in different sections of the line, whereby the harmonic effects in the various sections may be varied or differentiated, for purpose of comparison, and the location of the fault thus determined as between the various sections of the line. The nature of the invention will be understood with more particularity by reference to the illustrative arrangement shown in the drawing. Here A and B represent three-phase power stations which are linked up electrically by the lines 10, 11 and 12 and protected by blow-out choking coils C affording earthing reactance which is tuned to resonance with the system. At the stations A and B, or at other appropriate points, there are inserted in the lines 10, 11 and 12 transformers 15 and 16. Indicating instruments 17 and 18, which are perceptibly responsive to the harmonic effects occurring on the lines, may be connected to the secondaries of the transformers in the respective lines by means of the switching arrangements 19 and 20, so that a comparison of the conditions existing on the respective lines, as to the harmonics prevailing thereon, may be made by an auditory inspection. As between the lines thus inspected upon the occurrence of a fault, the one productive of the most intense sound in the instrument will be the one in which the fault exists. For the purpose of determining the location of the fault as between different sections of the faulty line, which in this instance may be considered line 12 which is grounded at the point F, provision is made for varying the impedance of the line, with respect to the indicative harmonic current, between the points where the inspecting instruments are linked to the line. To accomplish this there are linked with the line at any appropriate point, or at various points, as at the junctions of the various sections of the line, choking coils 21, which are provided with short-circuiting connections 22, through which they may be short-circuited by the switch device 24. The choke coils, in their normal short-circuited condition, are without detrimental effect upon the current harmonics, so that the current harmonics from F will in general be equally effective on the inspecting devices linked to the line at either side of them. By opening the short-circuiting connections of the choke coil, however, it is rendered effective upon the line to raise the inductive resistance of the portion of the line on its side of the fault to the harmonic current, with the result that an appreciably greater part of the harmonic current will take the path toward the station on the opposite side of the fault. As a consequence, in the instance illustrated, the opening of the circuit of the choke coil on the side of the fault F toward the station B, will result in an increase of the flow of the harmonic current to station A, with the result that the intensity of sound in the instrument 17 will be perceptibly increased. Conversely, the intensity of sound in instrument 18 will be perceptibly decreased. It is thus definitely determined, from inspection of either instrument and comparison of its manifestations before and after the introduction of the effect of the choke coil, that the fault lies in the section of the line between the choke coil and the station A. By the insertion of the choke coils at intervals, the fault may be definitely located, in this manner, in a particular section of the line. In this connection, only one set of such coils and the associated switch 24 have been shown for the purpose of illustrating how the same may be embodied or connected in the system. It will be readily understood, however, that any number of similar sets may be provided in like manner and distributed as desired, depending upon particular conditions.

The choking coils may be designed conveniently as two-winding transformers with secondaries which can be short-circuited or open-circuited as desired.

What I claim is:

1. In apparatus of the character described for the location of faults, a high tension network, protective earthing inductance associated with said network, polyphase lines forming part of said network, an indicating instrument responsive to harmonic currents, means for coupling the instrument with any one of said lines, and means providing for imposition of impedance on the selected line to which said instrument is coupled.

2. A method of locating a fault in an electrical transmission line, comprising first observing the abnormal harmonic current effects thereof existing therein as a result of a fault, followed by the imposition upon the line of an impedance to said harmonic currents and observing the effects of the abnormal harmonic currents then existing, and comparing the last mentioned said effects with the effects of said currents first observed.

3. A method of locating a fault in an electrical transmission line having protective earthing inductance, comprising observing the abnormal harmonic current effects existing on the line as a result of a fault, imposing an impedance at different points on the line, observing the harmonic current effects existing subsequent to such imposition of impedance and comparing said last mentioned effects with such effects first observed.

4. In a polyphase system comprising a plurality of electrical transmission conductors, the combination with a protective earthing inductance for the system, of impedance devices associated with said line conductors, means for selectively rendering the said devices effective to permit indication of the effects of abnormal harmonic currents in said line as a result of a fault therein, an indicating instrument responsive to such harmonic current effects, and means for selectively coupling said instrument to said conductors.

5. The combination with a polyphase system comprising a plurality of electrical transmission conductors, and a protecting earthing inductance therefor, of impedance devices associated with said conductors for rendering effective means for indicating harmonic currents in said conductors resulting from a fault therein, a device responsive to such harmonic currents, and means for selectively coupling said device to said conductors to indicate the location of a fault in any of said conductors.

In testimony whereof I have hereunto subscribed my name this 25 day of August, A. D. 1926, at Zurich, Switzerland.

JULIUS JONAS.